US011846355B2

(12) United States Patent
Phelps et al.

(10) Patent No.: US 11,846,355 B2
(45) Date of Patent: Dec. 19, 2023

(54) DUAL WINDAGE BLOCKER AND RETENTION FEATURE DESIGN FOR SEAL ASSEMBLY

(71) Applicant: Raytheon Technologies Corporation, Farmington, CT (US)

(72) Inventors: Joseph B. Phelps, Vernon, CT (US); Sean P. McGee, Andover, CT (US); Aneil S. Hegde, Mansfield Center, CT (US)

(73) Assignee: RTX Corporation, Farmington, CT (US)

( * ) Notice: Subject to any disclaimer, the term of this patent is extended or adjusted under 35 U.S.C. 154(b) by 495 days.

(21) Appl. No.: 17/072,744

(22) Filed: Oct. 16, 2020

(65) Prior Publication Data

US 2022/0120346 A1 Apr. 21, 2022

(51) Int. Cl.
*F16J 15/32* (2016.01)
*F16J 15/3224* (2016.01)
*F16J 15/3268* (2016.01)

(52) U.S. Cl.
CPC ........ *F16J 15/3224* (2013.01); *F16J 15/3268* (2013.01)

(58) Field of Classification Search
CPC ...... F16J 15/3224; F16J 15/3268; F16J 15/36; F16J 15/3452; F16J 15/3472
See application file for complete search history.

(56) References Cited

U.S. PATENT DOCUMENTS 2,556,393 A * 6/1951 Holben .................... F16J 15/38 277/377
2,892,642 A * 6/1959 Payne ...................... F16J 15/36 277/391
2,984,505 A * 5/1961 Andresen ................. F16J 15/36 277/391
2,984,506 A * 5/1961 Andresen ................. F16J 15/36 277/394
3,276,780 A 10/1966 Andresen et al.
3,746,350 A * 7/1973 Mayer .................. F16J 15/3404 277/408
3,937,477 A * 2/1976 Gyory .................... F16J 15/164 277/377
4,465,427 A 8/1984 Libertini et al.
8,714,558 B2 5/2014 Berard
9,567,908 B2 2/2017 Bordne et al.
2019/0178381 A1* 6/2019 Miller .................... F16J 15/346

FOREIGN PATENT DOCUMENTS

EP 1544417 A2 6/2005

OTHER PUBLICATIONS

Extended European Search Report for EP Application No. 21203014.2, dated Mar. 17, 2022, pp. 4.

* cited by examiner

*Primary Examiner* — Eugene G Byrd
*Assistant Examiner* — L. Susmitha Koneru
(74) *Attorney, Agent, or Firm* — Kinney & Lange, P. A.

(57) ABSTRACT

A seal assembly includes a rotatable shaft and a stationary housing circumscribing the shaft to form radially inner and radially outer boundaries of a seal cavity and a buffer cavity adjacent to the seal cavity. A retention member engaging the housing within the seal cavity includes an end plate extending radially at the axial boundary between the seal and buffer cavities and a protrusion extending from the end plate into the buffer cavity.

16 Claims, 3 Drawing Sheets

10
16
16A
16B
18
20
22
24
25
14A
14B
14C
26A
26B
28
30
32
34
36
36A
36B
38
40
41
42
43
44
46
46A
46B
48
48A
50
50A
52
53A
53B
53C
53D
54
54A
56A
58
60
62,64
66

DUAL WINDAGE BLOCKER AND RETENTION FEATURE DESIGN FOR SEAL ASSEMBLY

BACKGROUND

The present disclosure relates to retention and windage blocker features for seal assemblies, and more specifically, seal assembly components that perform dual retention and windage blocking functions.

Gas turbine engines utilize oil-wetted bearing compartments that are enclosed by seal assemblies to support rotating components of the engine. Seal assemblies can include carbon seals, labyrinth seals, and brush seals, among others. Natural weepage across a wet seal interface (e.g., a wet face of a carbon seal), wear of seal assembly components, and other part failures contribute to oil loss from the bearing compartment, which can be detrimental to engine performance, durability, and operation. Some seal assemblies include a drain-back system to return oil loss to the bearing system or a scupper system to discharge oil loss overboard, each system positioned outside the bearing compartment to mitigate negative consequences resulting from oil loss into the engine. To facilitate the drain-back and scupper systems, windage blockers are used to prevent oil recirculation, which can occur within a circumferential air flow driven by shaft rotation. With the aid of windage blockers, the drain-back system or scupper system of the seal assembly allows oil to collect and drain away from detrimental regions of the engine.

Typically, the drain-back or scupper system requires both stationary and rotating components to guide oil along an intended path, which can occupy significant space in some applications. In space-limited applications, the space available may be insufficient to implement the requisite components found in conventional drain-back or scupper systems.

SUMMARY

A seal assembly in accordance with an exemplary embodiment of the present invention includes a shaft rotatable about an axis and a housing circumscribing the shaft. The shaft and the housing form radially inner and radially outer boundaries, respectively, of a first cavity and a second cavity adjacent to the first cavity. A retention member engages a radially inner surface of the housing within the first cavity, which includes a protrusion extending from an end plate of the retention member into the second cavity, interrupting a circumferential flow of air within the second cavity.

DETAILED DESCRIPTION

Figure 1:
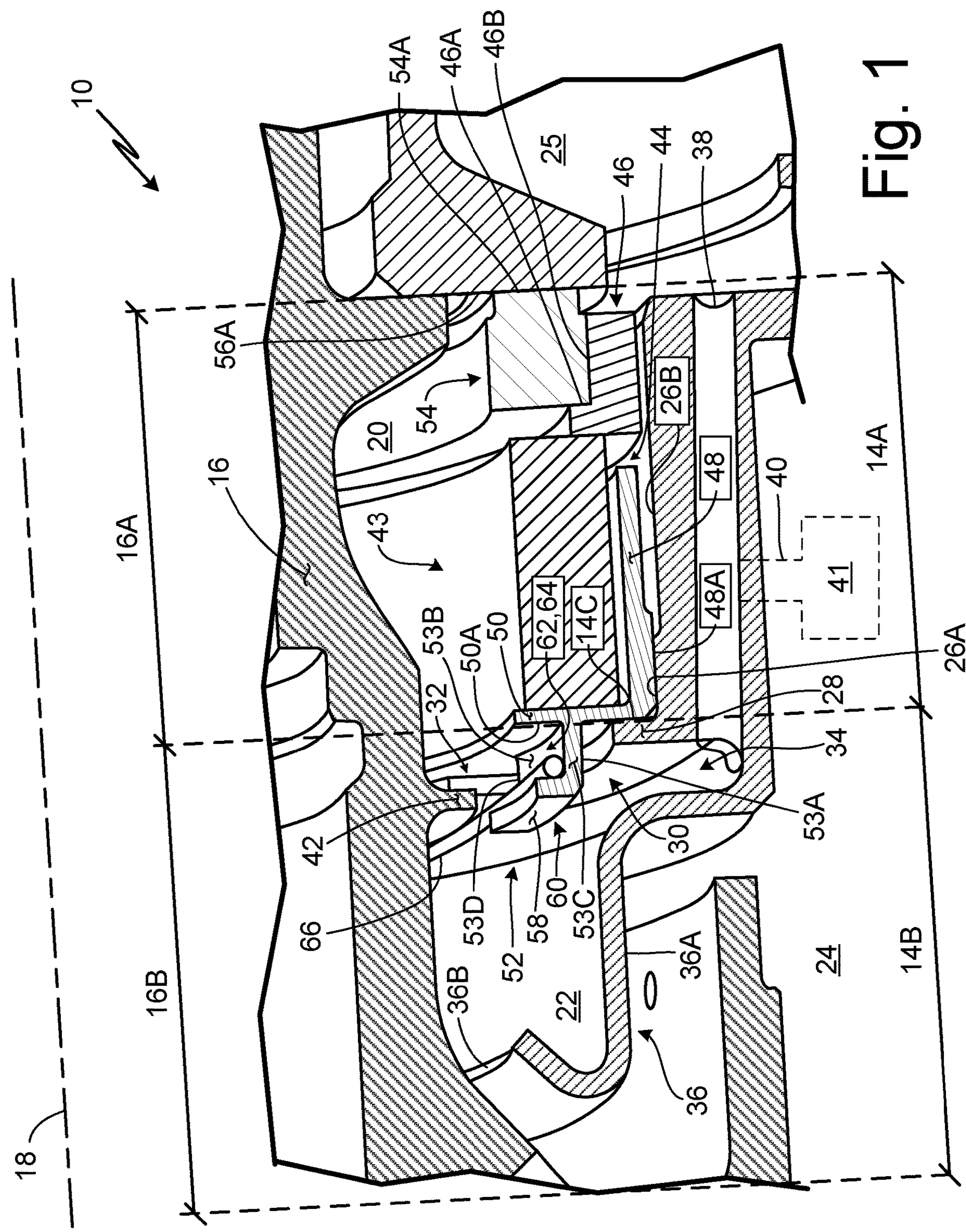
FIG. 1 is an isometric partial section view of a seal assembly in which a retention member of the assembly includes a protrusion extending into a buffer cavity adjacent to the seal assembly.

As disclosed herein, a seal assembly includes a component that performs a windage-blocking function as well as a retention function. In some embodiments, a protrusion can be incorporated into a retention member of the seal assembly, extending from an end plate of the retention member into a buffer cavity to interrupt, block, or guide a circumferential flow of air and oil contained therein. For example, the retention member may include a cylindrical body and a windage-blocking protrusion extending from opposing sides of an annular end plate of the retention member of the seal assembly. Together, the cylindrical body and annular end plate engage corresponding surfaces of a seal housing to retain a preloading element in the radial and axial directions. Additionally, because the preloading element joins to the annular end face, the retention member circumferentially retains the preloading element by engaging circumferentially adjacent and radially-extending tabs of the seal housing with the axially-extending protrusion. Further, the axial extension of the protrusion into the buffer cavity at an end of the seal assembly deflects or blocks a circumferential flow containing a mixture of air and oil so that the oil can be collected and returned to the seal cavity or discharged externally.

The protrusion can be part of an array of protrusions spaced circumferentially about the retention member, each protrusion extending into the buffer cavity of the seal assembly. One or more of the protrusions can have radially-facing major surfaces, circumferentially-facing major surfaces, or some protrusions can have radially-facing major surfaces while other protrusions have circumferentially-facing surfaces. In some embodiments, the protrusions can be spaced equally or, in other embodiments, unevenly spaced about a circumference of the retention member. In some unevenly spaced arrangements, the protrusion can be asymmetrically spaced about the circumference of the retention member, which aids mistake-proof assembly.

Further, the geometry of each protrusion can be identical or, in some embodiments, the protrusion geometry can differ based on retention requirements or to better direct the flow within the drain-back system for improved performance. For instance, the circumferential extent of one or more protrusions can be greater than or less than the remaining protrusions within the array. In some examples, the circumferential and/or axial extent of the protrusions relative to the openings and tabs of the housing can fully restrain the retention member relative to the housing or, alternatively, permit limited movement of the retention member relative to the housing in one or both of the axial and circumferential directions. These circumferential features can also be adjusted to help guide the flow of air and oil as needed based on performance requirements. Additionally, the protrusions can be located at a common radial distance from a centerline axis. In other examples, the radial distance from the centerline axis can vary for some or all protrusions to guide the flow of air and oil at respective angular positions along the circumference of the retention member. Other protrusion characteristics affecting windage and/or fluid collection within the buffer cavity include the number of protrusions, the angular spacing between adjacent protrusions, the axial extent of each protrusion relative to the axial position of a fluid slinger, or the axial position of a fluid collection trough, and the radial gap between the radially outer surface of each protrusion and the radially inner surface of a windage baffle or other component of the seal assembly positioned radially outward from the protrusion. Any of the foregoing characteristics can be tailored to specific sealing applications, increasing or decreasing windage deflection commensurate with an amount of windage produced by the shaft and other rotating components.

As such, the retention member combined with one or more protrusions retains components of the seal assembly in the radial, axial, and circumferential directions as well as blocking, guiding, and/or deflecting a circumferential flow within an adjacent buffer cavity. Seal assemblies with this configuration enable the seal assembly to perform both retention and windage blocking functions within a smaller space, and in particular, within radially-constrained applications found in some gas turbine engines.

FIG. 1 is an isometric partial section view of seal assembly 10 in accordance with an exemplary embodiment of the present invention. Seal assembly 10 includes housing 14 circumscribing shaft 16, which is rotatable about axis 18. Disposed between housing 14 and shaft 16 are seal cavity 20 and buffer cavity 22, the radially inner and radially outer boundaries of which are formed by seal cavity portions 14A and 16A and buffer cavity portions 14B and 16B of housing 14 and shaft 16, respectively. Buffer cavity 22 is positioned at an axial end of seal assembly 10 between seal cavity 20 and region 24 surrounding seal assembly 10. Disposed adjacent to an axial end of seal assembly 10 opposite buffer cavity 22 is lubrication cavity (or fluid cavity) 25. As will be discussed below, seal assembly 10 retains lubricating oil, or another fluid, within cavity 25 such as a bearing housing of a gas turbine engine.

Seal cavity portion 14A of housing 14 includes one or more bores 26A and 26B, one or more of which can be sized to interface with components of seal assembly 10. Between seal cavity portion 14A and buffer cavity portion 14B, housing 14 includes plate 28 extending radially inward from one of bores 26A and 26B, which in FIG. 1 is bore 26A. Plate 28 defines at least one opening 30 extending through an axial thickness of plate 28. In some embodiments, plate 28 defines multiple circumferentially spaced openings 30. Portions of plate 28 between circumferentially adjacent openings 30 define tabs 32, each tab 32 extending radially inward from plate 28.

Buffer cavity portion 14B includes trough 34 that defines a circumferentially continuous groove along a radially inner surface of housing 14 adjacent to plate 28. Housing 14 further includes baffle 36 that includes first portion 36A extending axially from trough 34 to second portion 36B, which extends radially inward toward shaft 16. Surfaces of baffle 36 and trough 34 can be contoured to promote collection of oil, or another fluid, into trough 34 that has been leaked from seal cavity 20 into buffer cavity 22. For example, the radially outermost surface of trough 34, or the bottom of the circumferential groove, can be rounded and the transitions between the first portion 36A and second portion 36B of baffle 36 and between baffle 36 and trough 34 can be rounded as shown in FIG. 1. Additionally, one or both of the axial width and radial depth of trough 34 can vary, or remain constant, along the circumference of trough 34 to further promote collection of oil, or another fluid. For instance, the axial width of trough 34 can increase to promote oil collection while increasing the radial depth and/or axial width of trough 34 permits greater quantities of fluid to collect and separate from the circumferential flow within cavity 22.

Extending from trough 34 into and through housing 14 is drain-back passage 38 or scupper passage 40, which is depicted using dashed lines in FIG. 1. A seal assembly incorporating a drain-back system includes drain-back passage 38 that extends from trough 34 through seal cavity portion 14A of housing 14 to lubrication cavity, or fluid cavity 25. Alternatively, a seal assembly incorporating a scupper system includes scupper passage 40 that extends from trough 34 through seal cavity portion 14A to communication with space 41 external to seal assembly 10, which is represented schematically in FIG. 1. In either configuration, drain-back passage 38 or scupper passage 40 can be located at or near a bottom of housing 14, the bottom determined by the location at which oil, or another fluid, tends to collect in an installed position. Drain-back passage 38 or scupper passage 40 can be inclined such that an inlet end of passage 38 or 40 at trough 34 is radially inward from an outlet end of passage 38 or passage 40 to promote drainage of oil, or another fluid, from trough 34.

Radially inward from trough 34, shaft 16 can include slinger 42. Formed by a disk that is attached to or manufactured integrally with shaft 16, slinger 42 redirects oil radially outwards due to centrifugal force imposed on the oil by rotation of shaft 16. While slinger 42 can be located at any suitable location along shaft 16, an axial position on shaft 16 coinciding with trough 34 directs oil ejected from slinger 42 towards trough 34 and, thereafter, drain-back passage 38 or scupper passage 40.

Disposed within seal cavity 20 and radially inward from housing 14, seal assembly 10 includes preload element 43 joined at opposite axial ends to retention member 44 and support ring 46. Retention member 44 includes cylindrical body 48, end plate 50, and protrusion 52 or, as discussed further below, a circumferential array of protrusions 52. Cylindrical body 48 extends axially and concentrically along axis 18. Radially outer surface 48A of cylindrical body 48 engages bore 26A of housing 14, which can be sized to form a location fit or interference fit. In addition to or in place of the fit, cylindrical body 48 can be secured to housing 14 using a pin, a key, a snap fit, a set screw, or other suitable mechanical restraint extending between housing 14 and cylindrical body 48. End plate 50 extends radially inward from cylindrical body 48 at a boundary between seal cavity 20 and buffer cavity 22. Axial face 14C of housing 14 abuts corresponding axial face 50A of end plate 50. Protrusion 52 extends through opening 30 into buffer cavity 22 from axial face 50A of end plate 50. Circumferentially-facing surfaces of protrusion 52 engage or are retained by opposing circumferential surfaces bounding opening 30.

Preload element 43 is a resilient and compressible member that imposes an axial force onto carbon seal 54, retaining seal 54 against seal seat 56. For instance, preload element 43 can be a bellows spring. In other embodiments, preload element 43 can include one or more undulations, or axially deflectable elements, that produce an axial force when preload element 43 compresses axially. Support ring 46 includes axial surface 46A and radially inner surface 46B that engage corresponding surfaces of carbon seal 54 and, thereby, provide axial and radial support to carbon seal 54. Seal seat 56 includes sealing face 56A that engages an opposing contact face 54A of carbon seal 54 under load from preload element 43.

Protrusion 52 includes major surfaces 53A and 53B forming opposite sides of protrusion 52. Minor surfaces 53C and 53D extend from major surface 53A to major surface 53B and have less surface area relative to major surfaces 53A and 53B. As shown in FIG. 1, major surfaces 53A and 53B are radially-facing, curved surfaces of a constant radius with respect to axis 18. In other embodiments, major surfaces 53A and 53B can be flat rather than curved and/or circumferentially-facing. Circumferentially-facing surfaces of protrusions, whether those surfaces are major surfaces 53A and 53B or minor surfaces 53C and 53D, are restrained by and can engage opposing circumferential surfaces bounding opening 30.

Protrusion 52 can be placed at any angular location about axis 18. For instance, protrusion 52 can be located at or near drain-back passage 38 or scupper passage 40. In some embodiments, protrusion 52 can be within a 45-degree arc of drain-back passage 38 or scupper passage 40. In other embodiments, protrusion 52 can be within a 25-degree arc of drain-back passage 38 or scupper passage 40. Further, protrusion 52 can be located radially outward from slinger 42 and radially inward from trough 34 such that protrusion 52 deflects at least a portion of oil ejected from slinger 42 to allow oil to drain into trough 34.

The radial position of protrusion 52 can be disposed at any radial distance from axis 18 that places protrusion 52 between shaft 16 and housing 14 so long as protrusion 52 does not interfere with adjacent features of shaft 16 and housing 14, for example, slinger 42 and baffle 36. The outer region between the radially outermost surface of protrusion 52 and a radially adjacent and innermost surface of baffle 36, or other feature of housing 14, can be tailored to suit specific applications. As the radial position of protrusion 52 moves radially outward relative to axis 18, the outer region decreases and provides greater obstruction to the circumferential flow adjacent to housing 14 and baffle 36. Similarly, as the radial position of protrusion 52 moves radially inward relative to axis 18, the outer region increases while an inner region between the radially innermost surface of protrusion 52 and shaft 16 or slinger 42 decreases and thereby, provides greater obstruction to circumferential flows adjacent to shaft 14 relative to flows adjacent to housing 14 and baffle 36.

Additionally, protrusion 52 can extend into cavity 22 by any amount that does not interfere with adjacent components of housing 14 and shaft 16. For instance, protrusion 52 can extend axially from retention member 44 by an amount such that at least a portion of protrusion 52 axially coincides with an axial position of slinger 42, trough 34, or both slinger 42 and trough 34. Embodiments of protrusion 52 axially coinciding, at least partially, with slinger 42 intercept fluid ejected radially outward by slinger 42 due to the rotation of shaft 16. Similarly, embodiments of protrusion 52 axially coinciding with trough 34 tend to redirect intercepted fluid to trough 34 more readily. In other embodiments, protrusion 52 can surpass slinger 42 and/or trough 34 in the axial direction to increase windage blocking and deflection capabilities of protrusion 52. Contrastingly, if less windage blocking and fluid deflection is desired or needed, protrusion 52 can extend axially into cavity 22 by an amount that is less than an axial distance to slinger 42 and/or trough 34.

Some embodiments of protrusion 52 include lip 58 extending from distal end 60 of protrusion 52 relative to end plate 50. In such embodiments, lip 58, protrusion 52, and end plate 50 define retaining groove 62. As shown in FIG. 1, lip 58 extends radially inward towards shaft 16 and, therefore, an open end of groove 62 faces radially inward towards shaft 16. However, in other embodiments, lip 58 can extend radially outward such that the open end of groove 62 faces radially outward towards housing 14. When multiple protrusions 52, each equipped with lip 58 and groove 62, are arranged in a circumferentially-spaced array, grooves 62 form segmented channel 64. Retention wire 66 can be installed within segmented channel 64 such that retention wire 66 is axially trapped between lip 58 and tabs 32 of housing 14 to axially restrain retention member 44.

Protrusion 52 can be sized relative to opening 30 to change the characteristics of the air and oil flow within the drain-back system based on requirements, to restrain retention member 44 in one or both of the axial and circumferential directions or, alternatively, to allow limited movement in one or both of the axial and circumferential directions. For example, the circumferential extent of protrusion 52 can be less than the circumferential extent of opening 30 by an amount that accounts for manufacturing and assembly tolerances such that little to no relative circumferential movement is permitted between retention element 44 and housing 14. In other examples, the circumferential extent of protrusion 52 can be less than the circumferential extent of opening 30 by an additional amount to permit limited circumferential movement between retention member 44 and housing 14. Additionally, variations in circumferential extent of protrusion 52 can be used to create more or less resistance to air and oil flow through the system, helping guide it for reduced leakage based on metrics. Similarly, the axial extent of protrusion 52 incorporating lip 58 can be sized to protrude by an amount such that the distance between tab 32 and lip 58 is at least the maximum axial dimension of retention wire 66 combined with tab 32. With this configuration, little to no relative axial movement between retention member 44 and housing 14 is permitted. In other examples, protrusion 52 can extend by an additional amount beyond the maximum axial dimension of retention member 44 and housing 14 to permit limited axial movement between retention member 44 and housing 14. Similarly, axial geometry can also be adjusted to create more or less windage as necessary and to guide air and oil flow through the system.

Figure 2:
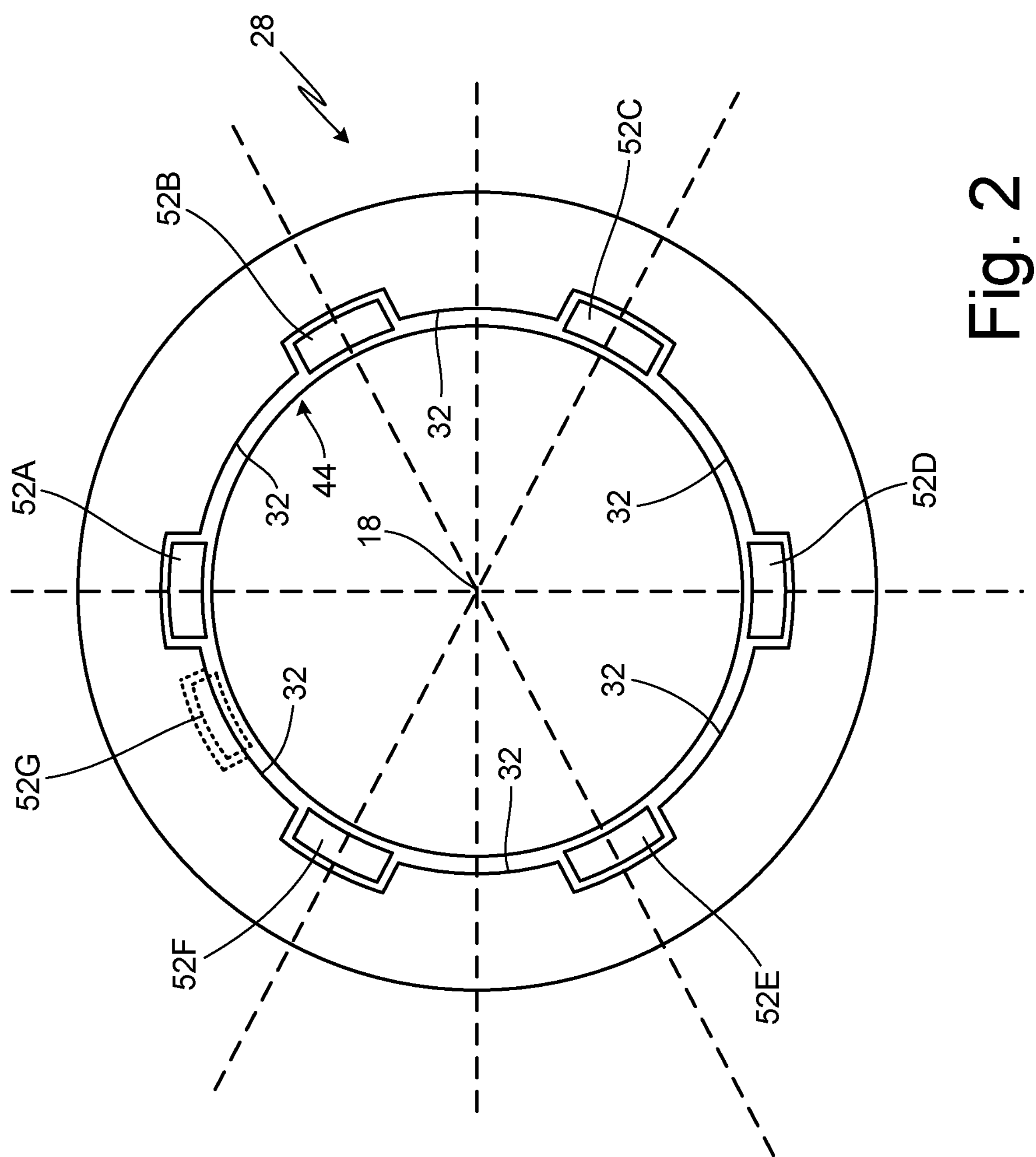
FIG. 2 is a schematic view showing an exemplary array of protrusions depicted in relation to corresponding housing tabs.

FIG. 2 is a schematic view showing an array of protrusions 52 interfacing with multiple tabs 32. While any suitable number of protrusions 52 and tabs 32 can be used, the depicted example includes protrusions 52A, 52B, 52C, 52D, 52E, and 52F. Protrusions 52A-52F are equally spaced about axis 18. However, in other embodiments, one or more of protrusions 52A-52F could have a different circumferential spacing to create an asymmetric pattern of protrusions 52A-52F. For example, in lieu of protrusion 52A, protrusion 52G can be used, which is shown with dashed lines. As shown in FIG. 2, circumferential spacing between protrusions 52F and 52G is different than circumferential spacing between protrusions 52G and 52B. In other embodiments, the angular spacing of protrusions 52A (or 52G), 52B, 52C, 52D, 52E, and 52F can be varied to tailor flow deflection capabilities within cavity 22. For instance, one or more of protrusions 52A-52G can be have less angular spacing to adjacent protrusions 52 relative to one or more other protrusions 52A-52G in regions of cavity 22 where greater deflection of the circumferential flow is desired or required. In some examples, protrusions 52A-52G located near drain back passage 38 or scupper passage 40 can have less angular spacing than protrusions 52A-52G remote from passage 38 or passage 40. One or more of protrusions 52A-52G can have a circumferential width that is different from than the remaining protrusions within protrusions 52A-52G. As depicted in FIG. 2, the circumferential width of protrusion 52A, or protrusion 52G, is less than respective circumferential widths of protrusions 52B-52F, each of which are shown with identical geometry.

Figure 3:
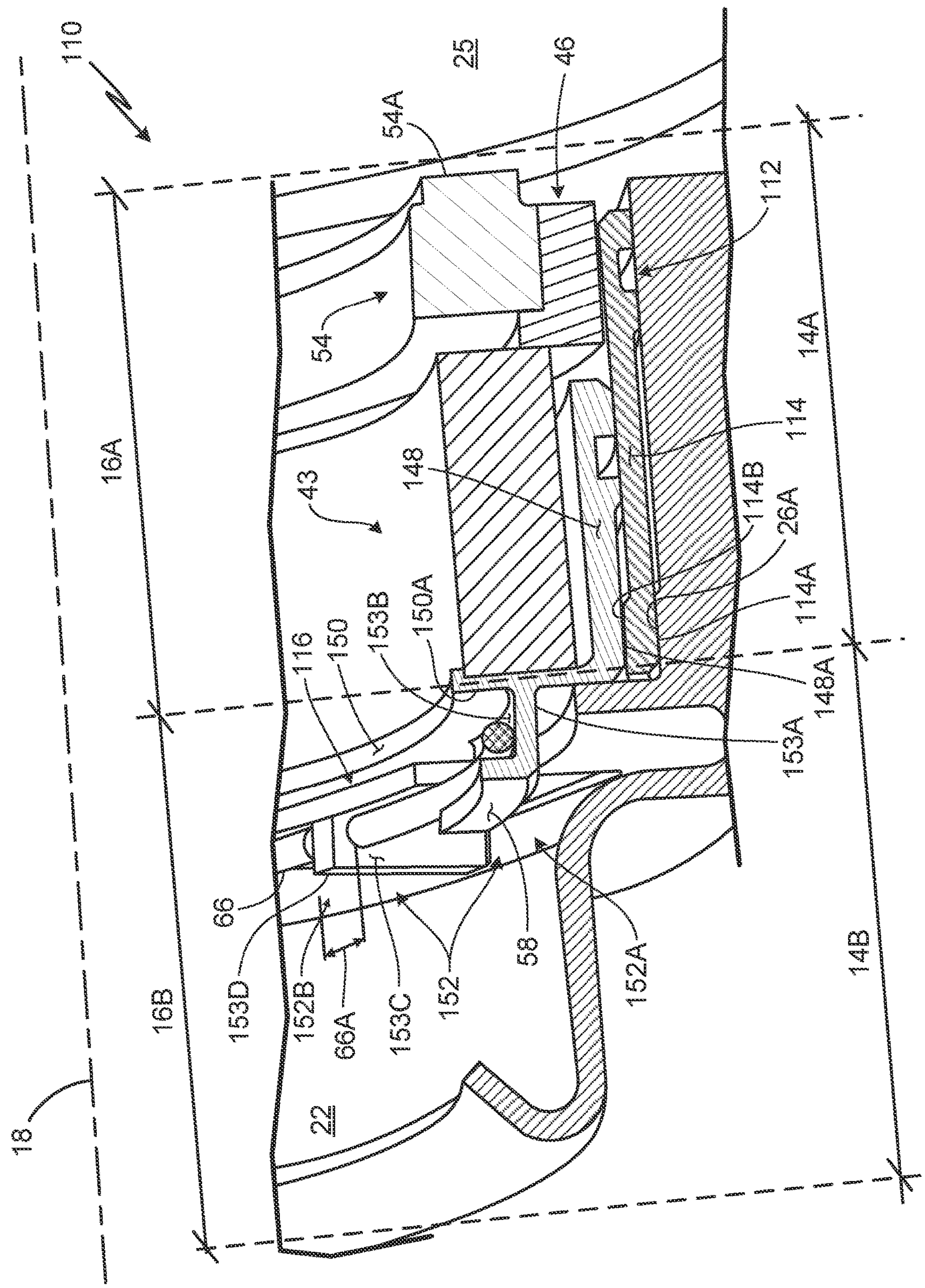
FIG. 3 is an isometric partial section view of a shrouded seal assembly depicting protrusions on the retention member and shroud.

FIG. 3 is partial section view of shrouded seal assembly 110, which includes many of the same components of seal assembly 10. Shaft 16 and seal seat 56 are not depicted in FIG. 3 to reveal additional details of the underlying components but should be considered to have the same elements and function in a similar manner to seal assembly 10. Further, while geometry of housing 14 depicted in FIG. 3 may appear differently than similarly number components of FIG. 1, these components function in the same manner as described above.

In place of retention member 44, shrouded seal assembly 110 includes shroud 112 and retention member 144. Shroud 112 includes cylindrical portion 114 that extends along seal cavity portion 14A of housing 14 and at least one shroud tab 116 interposed between circumferentially adjacent protrusions 152 of retention member 144. Shroud tab 116 extends radially inward from cylindrical portion 114 of shroud 112. Radially outer surface 114A of cylindrical portion 114 engages bore 26A to form a location fit or interference fit. Retention member 144 includes cylindrical body 148 having radially outer surface 148A engaging radially inner surface 114B of cylindrical portion 114. End plate 150 includes axial face 150A that abuts plate 28 of housing 14.

Protrusions 152 are similar to any variation of protrusion 52 described in seal assembly 10, able to be configured in a manner described above. Protrusion 152A extends from end plate 150 into buffer cavity 22 and includes lip 58 as described above. Major surfaces 153A and 153B of protrusion 152A are radially-facing. Protrusion 152B, on the other hand, extends from shroud tab 116 into buffer cavity 22. Major surfaces 153C and 153D of protrusion 152B are circumferentially-facing. Retention wire 66 includes gap 66A to enable retention wire 66 to expand or contract during installation into groove 62. To restrain retention wire 66 circumferentially, protrusion 152B extends radially through gap 66A. The axial extension of both protrusion 152A and 152B interrupt, deflect, and/or block a circumferential flow within cavity 22 promoting collection of oil into trough 34.

Discussion of Possible Embodiments

The following are non-exclusive descriptions of possible embodiments of the present invention.

A seal assembly according to an exemplary embodiment of this disclosure, among other possible things includes a shaft rotatable about an axis, a housing circumscribing the shaft and forming a radially outer boundary of a first cavity and a second cavity at an axial end of the seal assembly. A retention member engages a radially inner surface of the housing within the first cavity. An end plate of the retention member extends radially inward from the radially inner surface of the housing and divides the first and second cavities. A protrusion extends axially from the end plate into the second cavity.

The seal assembly of the preceding paragraph can optionally include, additionally and/or alternatively, any one or more of the following features, configurations and/or additional components:

A further embodiment of the foregoing seal assembly, wherein the housing can include a trough extending circumferentially about the shaft within the second cavity.

A further embodiment of any of the foregoing seal assemblies, wherein the protrusion extends into the second cavity proximate the trough.

A further embodiment of any of the foregoing seal assemblies, wherein the retention member can include a cylindrical body extending from the end plate along the radially inner surface of the housing.

A further embodiment of any of the foregoing seal assemblies, wherein the end plate and the cylindrical body axially and radially retain a preloading element joined to the retention member by engaging surfaces of the housing.

A further embodiment of any of the foregoing seal assemblies, wherein the protrusion can include a first major surface and a second major surface opposite the first major surface.

A further embodiment of any of the foregoing seal assemblies, wherein the first and second major surfaces of the protrusion can be radially-facing.

A further embodiment of any of the foregoing seal assemblies, wherein the first and second major surfaces of the protrusion can be circumferentially-facing.

A further embodiment of any of the foregoing seal assemblies, wherein the protrusion can be one of a plurality of protrusions circumferentially spaced about the shaft.

A further embodiment of any of the foregoing seal assemblies, wherein each protrusion of the plurality of protrusions can include a lip extending radially from the second major surface.

A further embodiment of any of the foregoing seal assemblies, wherein the lips, the second major surfaces, and the end plate can form a segmented channel circumscribing the shaft.

A further embodiment of any of the foregoing seal assemblies, wherein the housing can include a plurality of tabs interposed between circumferentially-adjacent protrusions.

A further embodiment of any of the foregoing seal assemblies, wherein the retention member can be circumferentially-retained relative to the housing by mutual engagement of the tabs and protrusions.

A further embodiment of any of the foregoing seal assemblies, wherein the circumferential extent of one of the plurality of protrusions is greater than another protrusion of the plurality of protrusions.

A further embodiment of any of the foregoing seal assemblies, wherein the seal assembly can include a retention wire disposed within the segmented channel and axially retained by the lips of respective protrusions and the tabs of the housing.

A further embodiment of any of the foregoing seal assemblies, wherein the retention member can be retained axially by the retention wire and the end plate engaging an axial face of the tabs.

A further embodiment of any of the foregoing seal assemblies, where the protrusion can be a first protrusion and the seal assembly can include a second protrusion circumferentially spaced from the first protrusion.

A further embodiment of any of the foregoing seal assemblies, wherein the major surfaces of the first protrusion are radially-facing, and the major surfaces of the second protrusion are circumferentially-facing.

A further embodiment of any of the foregoing seal assemblies, wherein at least one protrusion of the plurality of protrusions can be disposed at a radial distance relative to the axis that is different from another protrusion of the plurality of protrusions.

A further embodiment of any of the foregoing seal assemblies, wherein the seal assembly can include a slinger extending radially outward from the shaft within the second cavity.

A further embodiment of any of the foregoing seal assemblies, wherein the protrusion can be disposed radially between the slinger and the trough.

A further embodiment of any of the foregoing seal assemblies, wherein the seal assembly can include a passage intersecting the trough and communicating with one of the first cavity or a space external to the seal assembly.

A further embodiment of any of the foregoing seal assemblies, wherein the protrusion is proximate the passage.

A further embodiment of any of the foregoing seal assemblies, wherein the seal assembly can include a support ring.

A further embodiment of any of the foregoing seal assemblies, wherein the seal assembly can include a preloading member disposed radially inward from the cylindrical body and joined to the retention member and the support ring.

A further embodiment of any of the foregoing seal assemblies, wherein the seal assembly can include a carbon seal engaged by the support ring and preloaded against a seal seat by the preloading member.

A further embodiment of any of the foregoing seal assemblies, wherein the preloading member is a bellows.

A further embodiment of any of the foregoing seal assemblies, wherein the preloading member includes one or more undulations.

A further embodiment of any of the foregoing seal assemblies, wherein the plurality of protrusions can be disposed radially inward from the trough.

A further embodiment of any of the foregoing seal assemblies, wherein at least one protrusion of the plurality of protrusions is proximate the passage.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seal assembly comprising:

a shaft rotatable about an axis;

a housing circumscribing the shaft and forming a radially outer boundary of a first cavity and a second cavity at an axial end of the seal assembly;

a trough defined by the housing and positioned within the second cavity;

a slinger extending radially outward from the shaft within the second cavity; and a retention member engaging a radially inner surface of the housing, the retention member comprising:

an end plate dividing the first and second cavities and extending radially inward from the radially inner surface of the housing, wherein an axial face of the end plate abuts the housing; and a plurality of first protrusions circumferentially spaced about the shaft and extending axially from the axial face of the end plate into the second cavity, wherein at least one first protrusion is proximate the trough and disposed radially between the slinger and the trough, and wherein each first protrusion comprises:

a first major surface;

a second major surface opposite the first major surface, wherein the first and second major surfaces face are radially-facing; and a lip extending radially from the second major surface, and wherein the lips, the second major surfaces, and the end plate form a segmented channel circumscribing the shaft.

2. The seal assembly of claim 1, the retention member further comprising:

a cylindrical body extending from the end plate along the radially inner surface of the housing, wherein the end plate and the cylindrical body axially and radially retain a preloading element of the seal assembly.

3. The seal assembly of claim 1, the housing comprising a plurality of tabs, each tab of the plurality of tabs interposed between circumferentially-adjacent first protrusions, wherein the retention member is circumferentially-retained relative to the housing by mutual engagement of the tabs and first protrusions.

4. The seal assembly of claim 3, wherein a circumferential extent of one of the plurality of first protrusions is greater than another first protrusion of the plurality of first protrusions.

5. The seal assembly of claim 3, and further comprising:

a retention wire disposed within the segmented channel and axially retained by the lips of respective first protrusions and the tabs of the housing, wherein the retention member is retained axially by the retention wire and the end plate engaging an axial face of the tabs.

6. The seal assembly of claim 1, wherein the retention member further comprises a second protrusion circumferentially spaced from one of the first protrusions, and wherein major surfaces of the second protrusion are circumferentially-facing.

7. The seal assembly of claim 1, wherein at least one first protrusion of the plurality of first protrusions is disposed at a radial distance relative to the axis that is different from another first protrusion of the plurality of first protrusions.

8. The seal assembly of claim 1, and further comprising:

a passage intersecting the trough and communicating with one of the first cavity or a space external to the seal assembly, wherein one of the first protrusions is placed proximate the passage.

9. A seal assembly comprising:

a shaft rotatable about an axis;

a housing circumscribing the shaft and forming a radially outer boundary of a first cavity and a second cavity at an axial end of the seal assembly, the housing comprising:

a plurality of tabs circumferentially spaced about the shaft, each tab extending radially inward towards the shaft;

a retention member comprising:

a cylindrical body engaging a radially inner surface of the housing;

an end plate dividing the first and second cavities and extending radially inward from the cylindrical body; and a plurality of protrusions circumferentially spaced about the shaft, each protrusion extending axially from the end plate into the second cavity and disposed between and engaging circumferentially adjacent tabs;

a support ring;

a bellows disposed radially inward from the cylindrical body and joined to the retention member and the support ring; and a carbon seal engaged by the support ring and preloaded against a seal seat by the bellows.

10. The seal assembly of claim 9, and further comprising:

a trough defined by the housing and positioned within the second cavity; and a passage intersecting the trough and communicating with one of the first cavity or a space external to the seal assembly;

wherein the plurality of protrusions is radially inward from the through; and wherein at least one protrusion of the plurality of protrusions is proximate the passage.

11. The seal assembly of claim 9, wherein a circumferential extent of one of the plurality of protrusions is greater than another protrusion of the plurality of protrusions.

12. The seal assembly of claim 9, wherein at least one protrusion of the plurality of protrusions comprises a first major surface and a second major surface opposite the first major surface, and wherein the first and second major surfaces face are radially-facing.

13. The seal assembly of claim 12, wherein each protrusion of the plurality of protrusions comprises a lip extending radially from the second major surface, and wherein the lips, the second major surfaces, and the end plate form a segmented channel circumscribing the shaft.

14. The seal assembly of claim 9, wherein at least one protrusion of the plurality of protrusions comprises a first major surface and a second major surface opposite the first major surface, and wherein the first and second major surfaces face are circumferentially-facing.

15. The seal assembly of claim 10, and further comprising:

a slinger extending radially outward from the shaft within the second cavity, wherein the plurality of protrusions is disposed radially between the slinger and the trough.

16. A seal assembly comprising:

a retaining means for restraining the seal assembly in the axial, radial, and circumferential directions; and and windage blocker means for obstructing a circumferential flow within a buffer cavity, the circumferential flow containing a mixture of air and oil and the buffer cavity disposed between an axial end of the seal assembly and a sealing cavity containing a seal;

wherein the retaining means and the windage blocker means are embodied in the same component of the seal assembly.

* * * * *